Feb. 13, 1923.
F. HAMMOND
LIQUID MEASURING AND DISPENSING APPARATUS
Filed Jan. 15, 1921
2 sheets-sheet 1
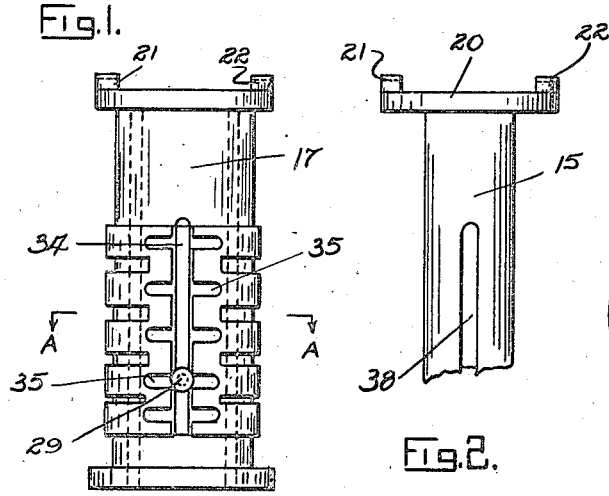
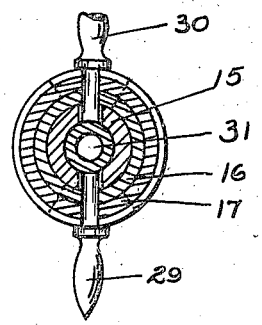
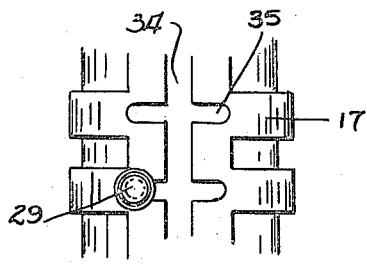
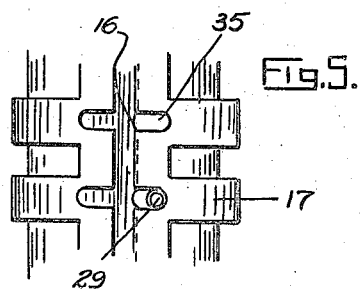
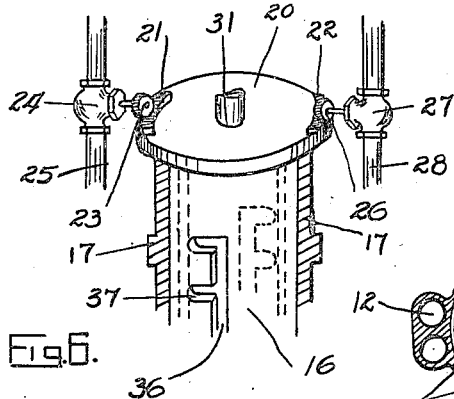
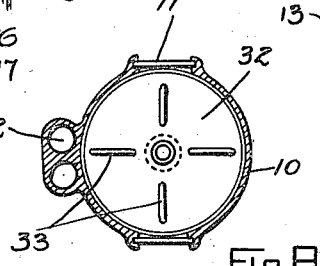
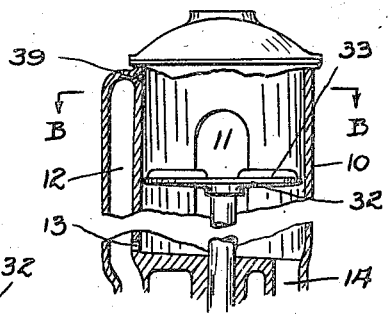
Inventor-
Frank Hammond.
By- B. Singer,
Atty.

Feb. 13, 1923.

F. HAMMOND

LIQUID MEASURING AND DISPENSING APPARATUS

Filed Jan. 15, 1921     2 sheets-sheet 2

1,445,212

Inventor—
Frank Hammond,
By B. Singer,
Atty.

Patented Feb. 13, 1923.

1,445,212

UNITED STATES PATENT OFFICE.

FRANK HAMMOND, OF SYDNEY, NEW SOUTH WALES, AUSTRALIA.

LIQUID MEASURING AND DISPENSING APPARATUS.

Application filed January 15, 1921. Serial No. 437,421.

REISSUED

*To all whom it may concern:*

Be it known that I, FRANK HAMMOND, a subject of the King of Great Britain, residing at Sydney, in the State of New South Wales, Commonwealth of Australia, have invented certain new and useful Improvements in Liquid Measuring and Dispensing Apparatus, of which the following is a specification.

This invention has reference to liquid measuring and dispensing apparatus and has been devised with the object of effectively locking and unlocking the inlet and outlet pipes as required, ensuring accurate measurement and delivery of the volume of liquid measured, and preventing accidental withdrawal of liquid from the measuring bowl.

The invention consists in means whereby the handles controlling the inlet and outlet pipes are so coupled that when the former is open the latter is closed and vice versa. This may be effected by means of toothed quadrants in such a manner that the liquid may pass into the measuring bowl and the volume measured before discharge of the liquid therefrom.

In cases where the measuring means comprises a tube adjustable as to height in the bowl, which tube is adapted to be raised or lowered by a handle or handles capable of being locked in horizontal slots in a sleeve branching from a vertical slot or slots, it has been found that there is a possibility of the handle or handles dropping down the vertical slots when at the neutral or midway position with possible escape back to the storage tank of the liquid in the measuring bowl. To obviate this I provide an inner locking sleeve having a vertical slot (or opposed vertical slots) which is or are provided with horizontal slots on one side only so that when the handle is brought to the neutral position the inner locking sleeve prevents it dropping or rising from its set position.

The controlled inlet pipe or passage from the storage tank is brought inside or adjacent the measuring bowl and is formed with an inverted U bend having a discharge opening at the bottom of the bowl, and in order to prevent a siphonage of the liquid back to the tank I make an air vent at the top of the bend.

A disc, preferably concave is provided on the end of the adjustable tube to avoid formation of a meniscus on the surface of the liquid and I may secure vertical radial fins thereon whereby any swirling of the liquid is more rapidly checked.

I will now refer to the two sheets of drawings herewith in order that the invention may be more readily comprehended.

Figure 1 is an elevation of the operating and locking and graduated sleeves.

Figure 2 is a part elevation of the operating sleeve.

Figure 3 is a section on line A—A Figure 1.

Figures 4 and 5 are part elevations showing the operating handle in the locked and discharge positions respectively.

Figure 6 is a part perspective partly in section showing the locking sleeve and valve operating means.

Figure 7:
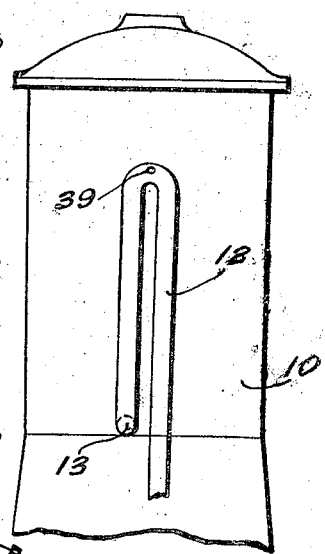
Figure 7 is a partial sectional elevation of the measuring chamber.

Fig. 7ª is a detail illustration of the measuring chamber, showing the inverted U-inlet 12.

Figure 8 is a section on line B—B Figure 2.

Figure 9:
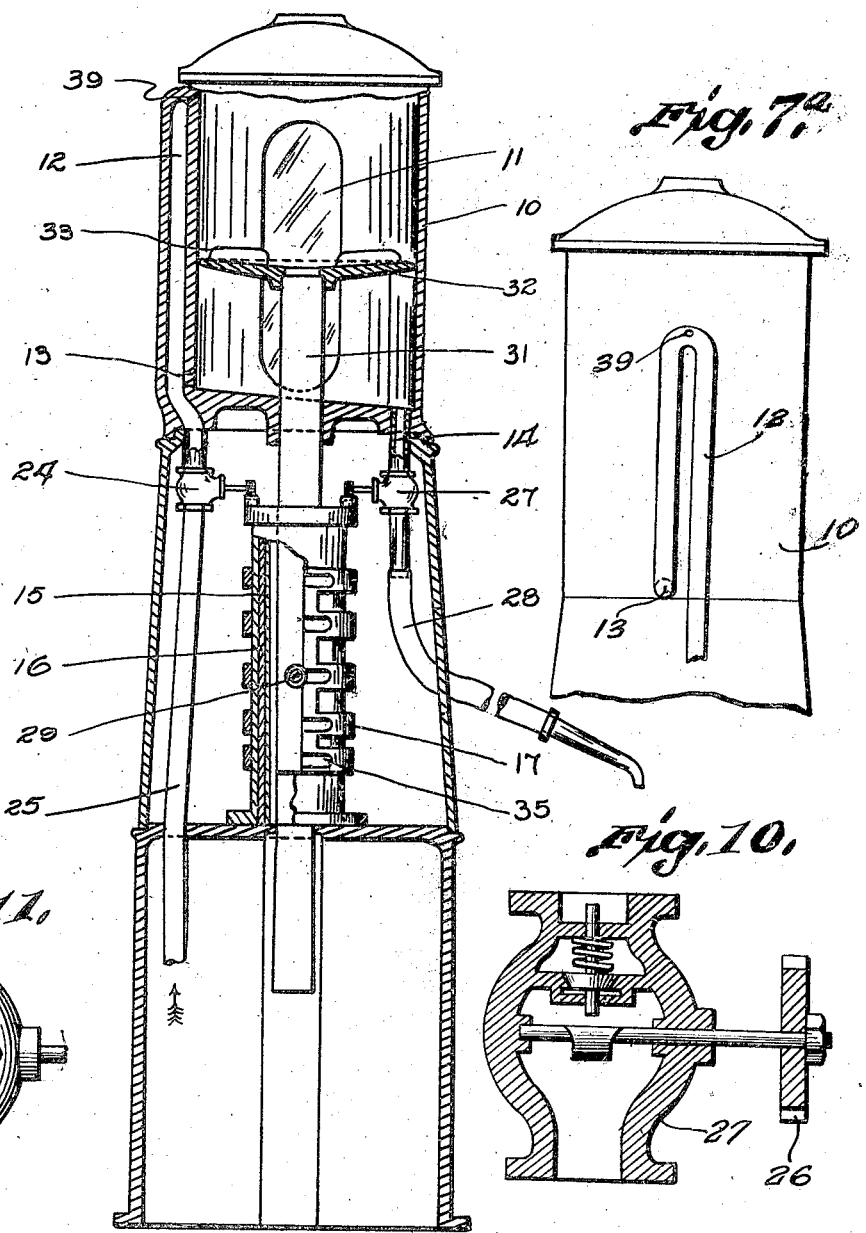

Figure 9 is an elevation partly in section of an apparatus provided with my improvements.

Figure 10:
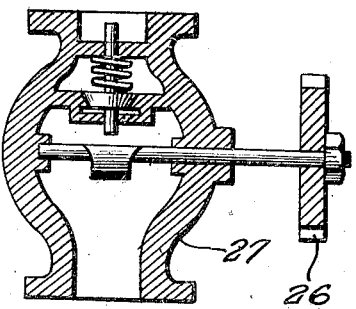

Fig. 10 is a detail sectional view of one of the valves.

Figure 11:
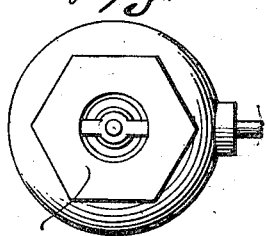

Fig. 11 is a detail top plan view of the same.

The same numerals indicate the same or corresponding parts.

10 is the measuring chamber provided with two or more transparent view portions or insets 11 graduated according to the capacity measures desired. 12 is an inverted U inlet pipe in communication with a pump or gravity supply tank containing the liquid and delivering through a passage 13 adjacent the bottom of the chamber which is preferably inclined towards the discharge outlet 14. 15 represents the operating sleeve, 16 the locking sleeve and 17 the outermost or graduated sleeve marked with capacity indications corresponding to those viewed through or on the transparent portions 11.

The operating sleeve 15 has secured thereto the circular plate 20 on which are oppositely positioned the quadrant racks 21 and 22 the former of which is in engagement with the pinion 23 controlling the valve 24 on the supply pipe 25 in communication with the pipe 12, while the rack 22 is in engagement with the pinion 26 controlling the delivery valve 27 on the discharge pipe 28 in communication with the outlet 14. The valves 24, 27 are alike in construction, and hence I only show one of them in detail in Figs. 10 and 11.

The operating handles 29 and 30 are secured on the vertically slidable overflow tube 31 on which, within the chamber, is the disc 32 preferably concave and having on its upper face the radial fins or baffles 33.

On the graduated sleeve 17 is the vertical slot 34 from which branch on each side the horizontal slots 35 and on the locking sleeve 16 is the vertical slot 36 from which branch from one side thereof the horizontal slots 37. The operating sleeve 15 has the vertical slot 38. The opposite sides of the apparatus is similarly slotted except that the horizontal slots in the sleeve 16 extend from the other side of its vertical slot. Adjacent the bend of the pipe 12 is an air hole 39 in communication with the top of the chamber, to prevent an air lock.

The operation of the apparatus is as follows: The handles 29 and 30 are raised in the vertical slots 34, 36, and 38 on opposite sides to the required height as indicated on the graduated sleeve 17 and is then turned into the horizontal slots 35 and 37 on the right. This movement carries the operating sleeve 15 round and consequently the plate 20 and racks 21 and 22. These racks rotate the pinions 23 and 26, thereby simultaneously opening the supply valve 24 and closing the delivery valve 27. The handles also carry the locking sleeve 16 across with it thereby locking them as shown in Figure 5. When the liquid rises in the chamber to the predetermined height, each handle is carried across to the discharge side as shown in Figure 4 thereby unlocking the sleeve 16 and closing the valve 24 and opening the discharge valve 27 whereupon the liquid flows through the opening 14 and delivery pipe to the nozzle 28. When the liquid has been delivered and the chamber 10 is empty, the handles are returned to the neutral position, the sleeves 15 and 16 with their vertical slots 38 and 36 respectively being then in alignment with the vertical slot 34 in the graduated sleeve.

It is obvious that instead of two oppositely positioned handles the apparatus may be operated by one but two handles each capable of being moved in corresponding slots ensure certainty and balance of movement.

Having thus described my invention, what I claim as new and desire to protect by Letters Patent is:—

1. In liquid measuring and dispensing apparatus, the combination of a measuring chamber, a supply duct leading thereto, a discharge duct leading therefrom, valves in said ducts, a slidable vertical overflow tube having an operating handle, and concentric operating, locking, and graduated sleeves, said operating sleeve carrying means controlling said supply and discharge valves.

2. In liquid measuring apparatus and dispensing apparatus as claimed in claim 1, the operating sleeve provided with a vertical slot whereby said sleeve is adapted to be partially rotated by the handle, said sleeve carrying two quadrants in which engage two pinions controlling respectively the supply and discharge valves so that one is only open at the same time.

3. In liquid measuring and dispensing apparatus as claimed in claim 1, the concentric sleeves each provided with a vertical slot, the intermediate sleeve having branch horizontal slots on one side, and the outermost sleeve having horizontal slots on both sides of their respective slots.

4. In liquid measuring and dispensing apparatus, a vertically slidable overflow tube carrying a disc within the measuring chamber, said disc being preferably concave whereby the formation of a meniscus on the surface of the liquid is prevented substantially as described.

5. In liquid measuring and dispensing apparatus, a vertically slidable overflow tube carrying a disc within the measuring chamber, said disc having two or more radial fins or baffles on its upper surface for the purpose of checking any swirling of the liquid as it is delivered to said chamber substantially as described.

In testimony whereof I have hereunto set my hand.

FRANK HAMMOND.